(12) United States Patent
Johnson

(10) Patent No.: US 11,390,771 B2
(45) Date of Patent: Jul. 19, 2022

(54) FILAMENTS COMPRISING IONOMERS AND USE IN FUSED FILAMENT FABRICATION

(71) Applicant: Dow Global Technologies LLC, Midland, MI (US)

(72) Inventor: Lynda Kaye Johnson, Wilmington, DE (US)

(73) Assignee: Dow Global Technologies LLC, Midland, MI (US)

( * ) Notice: Subject to any disclaimer, the term of this patent is extended or adjusted under 35 U.S.C. 154(b) by 129 days.

(21) Appl. No.: 16/340,749

(22) PCT Filed: Oct. 12, 2017

(86) PCT No.: PCT/US2017/056269
§ 371 (c)(1),
(2) Date: Apr. 10, 2019

(87) PCT Pub. No.: WO2018/075323
PCT Pub. Date: Apr. 26, 2018

(65) Prior Publication Data
US 2021/0371692 A1    Dec. 2, 2021

Related U.S. Application Data

(60) Provisional application No. 62/411,076, filed on Oct. 21, 2016.

(51) Int. Cl.
| | | |
|---|---|---|
| *C09D 123/08* | (2006.01) | |
| *B33Y 10/00* | (2015.01) | |
| *B33Y 70/00* | (2020.01) | |
| *B29C 64/118* | (2017.01) | |
| *C08F 210/02* | (2006.01) | |
| *B29K 23/00* | (2006.01) | |
| *B29K 33/00* | (2006.01) | |

(52) U.S. Cl.
CPC ...... *C09D 123/0876* (2013.01); *B29C 64/118* (2017.08); *B33Y 10/00* (2014.12); *B33Y 70/00* (2014.12); *C08F 210/02* (2013.01); *B29K 2023/08* (2013.01); *B29K 2033/00* (2013.01); *B29K 2995/0077* (2013.01); *C08F 2800/20* (2013.01); *C08F 2810/50* (2013.01)

(58) Field of Classification Search
CPC .......... B33Y 70/00; B33Y 70/10; B33Y 10/00
See application file for complete search history.

(56) References Cited

U.S. PATENT DOCUMENTS

| | | | |
|---|---|---|---|
| 2014/0141166 A1 | 5/2014 | Rodgers et al. | |
| 2017/0087774 A1* | 3/2017 | Pawloski | B29C 64/40 |
| 2018/0036939 A1* | 2/2018 | Sundaresan | B33Y 30/00 |

FOREIGN PATENT DOCUMENTS

| | | | | |
|---|---|---|---|---|
| WO | 2016/126962 | 2/2015 | | |
| WO | 2015/175682 | 11/2015 | | |
| WO | WO-2015175682 A1 * | 11/2015 | | B29C 64/106 |
| WO | WO-2016126962 A1 * | 8/2016 | | B29C 64/112 |

OTHER PUBLICATIONS

PCT/US2017/056269, International Search Report and Written Opinion dated Jan. 24, 2018.
PCT/US2017/056269, International Preliminary Report on Patentability dated Apr. 23, 2019.

\* cited by examiner

*Primary Examiner* — Christopher M Rodd

(57) ABSTRACT

The disclosure generally relates to 3D printed articles prepared from filaments comprising an ionomer (A) prepared from a base resin (B); wherein: base resin (B) is prepared from ethylene and at least one $C_3$ to $C_8$ $\alpha,\beta$ ethylenically unsaturated carboxylic acid monomer; the carboxylic acid moieties of base resin (B) are 10 to 99.5 percent neutralized by zinc or lithium; the at least one $C_3$ to $C_8$ $\alpha,\beta$ ethylenically unsaturated carboxylic acid is present from about 2 weight percent to about 30 weight percent, based on the weight of base resin (B).

19 Claims, 1 Drawing Sheet

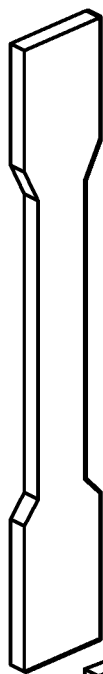
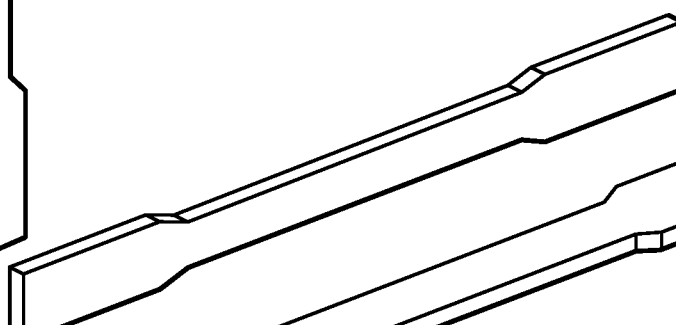
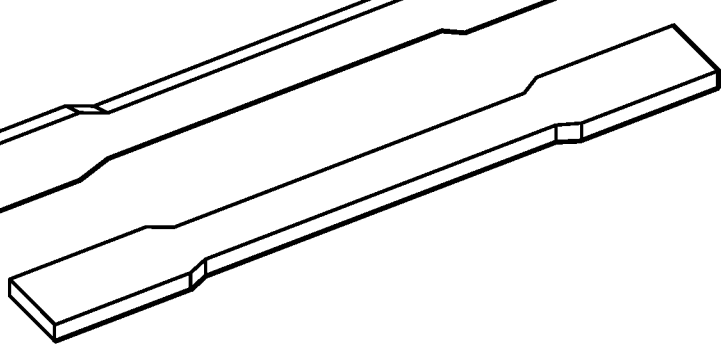
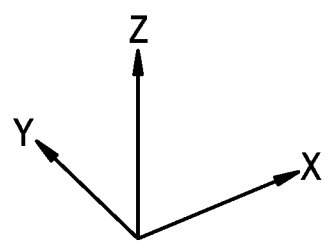

FILAMENTS COMPRISING IONOMERS AND USE IN FUSED FILAMENT FABRICATION

FIELD OF THE INVENTION

Disclosed herein are filaments comprising ionomers prepared from ethylene copolymers, the use of these filaments in fused filament fabrication (FFF) printing processes, and articles obtained from these FFF processes.

BACKGROUND OF THE INVENTION

Additive manufacturing, also known as 3-dimensional (3D) printing or FFF printing, is used to print or otherwise manufacture 3D parts from digital representations of the 3D parts (e.g., AMF and STL format files) using one or more additive manufacturing techniques. Successive layers of a composition are deposited and fused to produce an article having a defined shape. By the term "fused" is meant that the successive layers adhere to one another. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

Some of the aforementioned processes can be costly, especially the laser-based processes involving the use of high-power lasers. More economical is fused filament fabrication (FFF), a specific type of fused fabrication process in which a filament, fiber, or strand, enters the 3D printing device and a 3D object is formed by extruding the filament through a heated nozzle, where the filament is melted, to form layers and where each layer hardens after extrusion, i.e., layer-by-layer deposition. Fused filament fabrication simplifies material handling and compaction of material to be deposited as compared to using pellets or powders.

It is advantageous for materials used in fused filament fabrication to be compatible with a broad nozzle/hot-end temperature range. For example, in some instances, increasing the nozzle temperature can improve interlayer adhesion and increase the mechanical performance of a 3D-printed part. In other instances, materials that are capable of being printed at lower nozzle temperatures, while still retaining functional and aesthetic properties, exhibit broad compatibility with a wide variety of FFF printers, as well as reduced occurrence of dark spots in 3D printed parts. These dark spots are caused by small amounts of extruded material clinging to, and being decomposed by, the hot nozzle and subsequently being deposited on the 3D printed part.

Moisture-tolerant filaments are also needed for use in fused filament fabrication as 3D printers are used in a broad range of environments, often with high relative humidity. If a filament has absorbed moisture, printing at too high of a temperature will result in macroscopic bubbles, a rough surface, and compromised mechanical properties, such as lowered percent elongation at break. For this reason, a number of materials benefit from drying prior to printing. In an industrial setting, this drying is typically done at elevated temperature in a vacuum oven, which is not readily feasible in home and education environments. This adds time, cost, and storage issues to the printing process. Moisture tolerance is especially critical for polymers with low softening temperatures, as the temperatures needed to drive off moisture from spools of these filaments often lead to sticking together of the filament strands. To ensure continuous feeding of the filament into the hot-end of the 3D printer, the dried filaments of polymers with low softening temperatures frequently must be unspooled and re-spooled.

Ethylene copolymers (ECPs) have various combinations of flexibility/stiffness, strength and low softening temperatures. ECPs are used in food packaging, footwear foam, automotive parts, and decorative items such as perfume caps. A sodium ionomer of an ethylene copolymer comprising ethylene and methacrylic acid (T-Lyne, Taulman3D) was introduced into the 3D printing market in 2015. Similar to polylactic acid (PLA), one of the two most common materials used in FFF, T-Lyne can be printed without using a heated bed with low warpage, making it compatible with a wide-range of printers.

Like PLA, T-Lyne suffers from moisture sensitivity, exhibiting a lowered and limited nozzle temperature range after being exposed to moisture for a long period of time or if printed in high humidity environments, and with the corresponding printed parts exhibiting bubbles and reduced strength. In addition, parts printed from even dry T-Lyne exhibit significantly reduced z-directional elongation at break as compared to elongation at break measured in the x- and y-directions.

Hence, a need exists for moisture-tolerant ECPs that are useful in 3D printing processes and, particularly in FFF processes, that exhibit a broad nozzle temperature range. A need also exists for ECPs that are useful for increasing the performance characteristics of resultant 3D-printed articles, particularly for increasing z-directional properties.

SUMMARY OF THE INVENTION

Disclosed herein are filaments comprising: an ionomer (A), said ionomer (A) prepared from a base resin (B); wherein:
base resin (B) is prepared from ethylene and at least one $C_3$ to $C_8$ α, β ethylenically unsaturated carboxylic acid monomer;
the carboxylic acid moieties of base resin (B) are 10 to 99.5 percent neutralized by zinc or lithium; and
the at least one $C_3$ to $C_8$ α, β ethylenically unsaturated carboxylic acid is present from about 2 weight percent to about 30 weight percent, based on the weight of base resin (B).

Also disclosed herein are 3D-printed articles prepared from a conditioned or unconditioned filament, said filament comprising an ionomer (A) said ionomer (A) prepared from a base resin (B);
wherein:
base resin (B) is prepared from ethylene and at least one $C_3$ to $C_8$ α, β ethylenically unsaturated carboxylic acid monomer;
the carboxylic acid moieties of base resin (B) are 10 to 99.5 percent neutralized by zinc or lithium; and
the at least one $C_3$ to $C_8$ α, β ethylenically unsaturated carboxylic acid is present from about 2 weight percent to about 30 weight percent, based on the weight of base resin (B).

Additionally disclosed herein are processes for preparing 3D-printed articles from a conditioned or unconditioned filament, said process comprising the step of depositing a plurality of layers using a 3D printer to form said 3D-printed article wherein: said filament comprises an ionomer (A), said ionomer (A) prepared from a base resin (B); base resin (B) is prepared from ethylene and at least one $C_3$ to $C_8$ α, β ethylenically unsaturated carboxylic acid monomer;

the carboxylic acid moieties of base resin (B) are 10 to 99.5 percent neutralized by zinc or lithium; and the at least one $C_3$ to $C_8$ α, β ethylenically unsaturated carboxylic acid is present from about 2 weight percent to about 30 weight percent, based on the weight of base resin (B).

DETAILED DESCRIPTION OF THE INVENTION

Abbreviations

The claims and description herein are to be interpreted using the abbreviations and definitions set forth below:
"%" refers to the term percent
"mole %" refers to mole percent
"wt %" refers to weight percent
"Temp" is used herein as an abbreviation for "temperature".
Ranges and Preferred Variants Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

Definitions

As used herein, the article "a" refers to one as well as more than one and does not necessarily limit its referent noun to the grammatical category of singular number.

As used herein, the terms "about" and "at or about", when used to modify an amount or value, refer to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, fused filament fabrication (FFF) is an extrusion-based process also known as fused deposition modeling (FDM). A three-dimensional object is produced by extruding a filament comprising a thermoplastic material through a heated nozzle to form layers which solidify after extrusion. Typically, the details and steps of the process are as follows: A filament is unwound from a coil and fed to a heated extrusion nozzle, which can be turned on or off to control the flow. A worm-drive pushes the filament into the nozzle at a controlled rate. The nozzle heats the filament past its melting and/or glass transition temperature, and the melted material/filament is deposited by the extrusion head on a substrate to form a layer. Subsequent layers are deposited on top of the previous layer. After each layer is deposited, the position of the print head relative to the substrate is then incremented along a z-axis (perpendicular to the xy plane), and the process is then repeated to form a 3D part resembling the digital representation. The thermoplastic material used is typically selected and the temperature of the melt is controlled so that the material solidifies substantially immediately upon forming a layer on the base of the 3D printer, with the buildup of multiple layers to form the desired three-dimensional object.

As used herein, supporting layer(s) or supporting structure(s) refer to layers or structures that are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication and is removable from the completed 3D part when the printing process is complete. The support structure may be generated from the material itself or may be formed from another material using a second nozzle.

Properties of 3D-printed parts are frequently dependent upon the direction of measurement. Parts, such as tensile bars, printed in the xy plane are referred to herein as being printed "flat" or as printed in the "xy direction" or the "y direction". Correspondingly, parts, such as tensile bars, printed in the zx plane are referred to herein as being printed "vertical" or as printed in the "zx direction" or the "z direction". Correspondingly, parts, such as tensile bars, printed in the xz plane are referred to herein as being printed "on-edge" or as printed in the "xz direction", also referred to as the "x direction". Characteristics of a material or of a 3D part printed from a material in the xy and xz directions refer to the characteristics as measured perpendicular to the direction of layer by layer deposition. In contrast, characteristics of a material or of a 3D part printed from a material in the zx or z direction refer to the characteristics as measured parallel to the direction of layer by layer deposition.

As used herein, the term "ionomer" refers to ethylene copolymers comprising ethylene and a $C_3$ to $C_8$ $\alpha$, $\beta$ ethylenically unsaturated carboxylic acid wherein the carboxylic acid functionalities are at least partially neutralized with a metal, such as sodium, magnesium, lithium or zinc. The term "base resin" (B) refers to the composition of the ethylene copolymer before neutralization to form ionomer (A). Weight percent acid (wt % acid) in the base resin (B) is based upon the total weight of all $\alpha$, $\beta$ ethylenically unsaturated carboxylic acid monomers and ethylene in the base resin. Weight percent acid of the base resin (B) is measured by Fourier Transform Infrared Spectrophotometry (FTIR Analysis) using standards calibrated by titration. The degree of neutralization may be measured by several techniques. Thus, infrared analysis may be employed and the degree of neutralization calculated from the changes resulting in the absorption bands. Another method comprises the titration of a solution of the ionic copolymer with a strong base. Yet another method comprises X-ray fluorescence. All these methods are within the skill of one in the art.

As used herein, the term "conditioned" refers to the state of filaments that have been dried in a heated chamber or oven at 55-65° C. under a vacuum of 20-25 mm/Hg for a minimum of 24 hours. The term "unconditioned" refers to the state of filaments that have been stored in ambient conditions for a minimum of one week. As used herein, "ambient conditions" refers to an environment with a temperature in the range of about 20 to 25° C. and relative humidity in the range of about 35% to 60%.

The term "relative strength", as used herein, refers to a product of the tensile strength at break and the elongation at break for the test samples, as shown below in Equation 1:

$$\text{Relative Strength} = (\text{Tensile Strength at Break})(\% \text{ Elongation at Break}/100) \quad (1)$$

where the tensile strength at break and the percent elongation at break are each measured on test samples pursuant to ISO 527-2:2012. Accordingly, the relative strength of the test samples combines part strength and ductility measurements and is a good indicator for the robustness, fatigue life, etc. of printed 3D parts.

The term "percent neutralization" as used herein refers to the degree of neutralization or ionization of the total acid moieties present in ionomer (A). Percent neutralization can range from 0 to 100 percent. At zero percent, no ionization of the acid groups has occurred. At 100 percent, all the acid groups have been neutralized or ionized.

The term "relative percent neutralization", also written as "relative % neutralization", as used herein, is used to compare the amount of ion present in ionomers with varying acid numbers and percent neutralization. Relative percent neutralization refers to a product of the wt % acid of the ionomer (A) and the percent neutralization of the acid in the ionomer, as represented by Equation 2:

$$\text{Relative \% Neutralization} = (\text{wt \% Acid})(\text{Percent Neutralization}/100) \quad (2)$$

As used herein, "curl" is measured pursuant to a Curl Bar Test as described herein. Curl can be used as a quantitative method for measuring the residual stress in a 3D part, which is indicative of how many complex geometries can be built with an FFF system. Materials or compositions, when formed into test samples, and which exhibit significant curl can only be used to build very simple geometries such as cylinders printed along the layer-printing direction, e.g., built up in the vertical direction along the z-axis, which only display simple stresses. Compositions that exhibit less than about 5 mm, preferably less than about 3 mm, more preferably less than about 2.5 mm, and most preferably less than about 1 mm to 0.05 mm can be used to print large, complex geometries with extrusion-based additive manufacturing systems.

As used herein, the term "temperature range" refers to the range of nozzle or hot-end temperatures useful for 3D-printing parts with functional performance and aesthetic appearance using FFF. The temperature range is typically dependent upon the inherent properties of the composition used to prepare filaments, such as the decomposition and melting temperatures, as well as upon the level of plasticization of the material. Herein, "temperature range" is measured pursuant to a Temperature Range Test, as described herein. The Temperature Range Test involves printing a single-wall cylinder with 0% infill at various nozzle temperatures. The temperature region in which macroscopic bubbles are present due to release of moisture is identified by visual examination using the unaided human eye and correlated with the height/printing temperature of the cylinder in that region. Typically, there is an upper temperature T1, below which moisture is not released and the cylinder walls are printed without macroscopic bubbles, and a lower temperature T2, below which the cylinder is no longer printed either due to the filament no longer extruding from the nozzle or no longer adhering to the previously deposited layer. The "temperature range" at which a material can be printed is defined as the difference between T1 and T2, as show below in Equation 3:

$$\text{Temperature Range} = T1 - T2 \quad (3)$$

with T1 and T2 as defined and with temperatures measured in degrees Celsius. If no macroscopic bubbles are observed at any print temperature, T1 is assigned as the highest temperature used to print the cylinder wall. If the cylinder prints with smooth walls at the lowest attempted temperature, T2 is defined as that temperature.

Generally

Specifically disclosed herein are filaments comprising ionomers (A) prepared from ethylene copolymers (base resin (B)) in which the acid functional groups of base resin (B) have been partially neutralized with zinc and/or lithium ions. The ethylene copolymers are prepared from ethylene and at least one $C_3$ to $C_8$ $\alpha$, $\beta$ ethylenically unsaturated carboxylic acid monomer. The carboxylic acid moieties of base resin (B) are 10 to 99.5 percent neutralized by zinc or lithium and the at least one $C_3$ to $C_8$ $\alpha$, $\beta$ ethylenically unsaturated carboxylic acid is present from about 2 weight percent to about 30 weight percent, based on the weight of base resin (B).

Ionomers (A)

Ionomers (A) used to prepare filaments disclosed herein for use in 3D printing can be prepared from base resin (B). Base resin (B) is prepared from ethylene and at least one $C_3$ to $C_8$ $\alpha$, $\beta$ ethylenically unsaturated carboxylic acid monomer. The carboxylic acid functionalities of base resin (B) are partially neutralized by zinc ions, lithium ions, and combinations of these to form ionomers (A). Ionomer (A) may further comprise an additional metal in limited quantities so long as the properties of 3D printed articles prepared from such ionomers are not significantly decreased. Examples of additional metals include sodium and magnesium and mixtures of these.

The $C_3$ to $C_8$ $\alpha$, $\beta$ ethylenically unsaturated carboxylic acid may be present in base resin (B) from about 2 weight percent to about 30 weight percent, based on the total weight of ethylene and the at least one $C_3$ to $C_8$ $\alpha$, $\beta$ ethylenically unsaturated carboxylic acid monomer in base resin (B). Alternatively, the $C_3$ to $C_8$ α, β ethylenically unsaturated carboxylic acid may be present in base resin (B) from about 2 to 25 percent, preferably from about 2 to 18 percent, and more preferably from about 7 to 18 percent based on the total weight of ethylene and $C_3$ to $C_8$ α, β ethylenically unsaturated carboxylic acid monomer in base resin (B). Suitable $C_3$ to $C_8$ α, β ethylenically unsaturated carboxylic acids may be selected from the group consisting of methacrylic acid, acrylic acid, and combinations thereof. Preferably the $C_3$ to $C_8$ α, β ethylenically unsaturated carboxylic acid is methacrylic acid.

The carboxylic acid functionalities present in ionomer (A) are partially neutralized from about 10 to 99.5 percent, preferably from about 10 to 70 percent, and more preferably from about 15 to 60 percent by zinc or lithium ions, with zinc ions being most preferred.

Neutralization of the carboxylic acid functionality of base resin (B) may be accomplished by treating base resin (B) with inorganic base(s), as known in the art. Examples of such bases include zinc acetate, zinc oxide, lithium hydroxide, sodium methoxide, and magnesium acetate.

Relative percent neutralization of ionomer (A), ranges from about 0.5% to 10%, preferably from 0.5% to 8%, and more preferably from 1% to 7%. A specific value for relative percent neutralization can be achieved with various combinations of percent acid and percent neutralization. The concentration of $C_3$ to $C_8$ α, β ethylenically unsaturated carboxylic acid in base resin (B) and the degree of neutralization should be adjusted to achieve the desired relative percent neutralization. For example, for a percent neutralization of about 7%, a copolymer with 30% acid can be neutralized up to 23.3% or less; a copolymer with 20% acid can be neutralized up to 35% or less; a copolymer with 18% acid can be neutralized up to 38.9% or less; and a copolymer with 15% acid can be neutralized up to 46.7% or less.

Ionomer (A) may further comprise a comonomer selected from alkyl acrylate, alkyl methacrylate, or combinations of these. The comonomer may be present in a range from 0.1 weight percent to about 40 wt %, preferably to about 30 wt %, more preferably to about 15 wt %, and most preferably to about 5 wt %, based on the total weight of monomers in ionomer (A). The alkyl groups may have from 1 to 8 carbon atoms with suitable alkyl groups chosen from among, for example, methyl, ethyl, propyl, and butyl such as n-butyl, sec-butyl, isobutyl and tert-butyl.

Ionomer (A) is characterized by a melt index of at least about 1 g/10 minutes using a 2.16 kg weight measured according to ASTM D1238-13. Preferably, ionomer (A) has a melt index ranging from about 1 g/10 minutes to 50 g/10 minutes. Alternatively, ionomer (A) may have a melt index from about 4 g/10 minutes to 50 g/10 minutes, or from 5 g/10 minutes to 25 g/10 minutes.

Base resin (B) used to prepare ionomer (A) is characterized by a melt index of at least about 10 g/10 minutes to 250 g/10 minutes, preferably from about 20 g/10 minutes to 250 g/10 minutes, and more preferably from about 50 g/10 minutes to 230 g/10 minutes using a 2.16 kg weight measured according to ASTM D1238-13.

Filaments

Filaments useful in FFF processes to prepare 3D printed articles comprise ionomers (A) as described herein. The filaments may be wound onto a coil or reel for feeding into the hot end of 3D printers. A cartridge containing the wound filaments may be used for attachment to a 3D printer.

The filaments may additionally comprise, in addition to ionomer (A), about 0.0001 to about 50%, based on the total weight of ionomer (A) optional additives, such as plasticizers, stabilizers, antioxidants, ultraviolet ray absorbers, hydrolytic stabilizers, anti-static agents, dyes or pigments, fillers, fire-retardants, lubricants, processing aids, antiblock agents, release agents, and/or mixtures thereof. Preferably, the filaments comprise about 0.001 to about 10%, preferably about 0.001 to about 5%, and more preferably about 0.001 to about 2% of optional additives.

Process for Producing Filaments

The filaments, strands, or fibers described herein for use in a fused fabrication process may be formed by any method known in the art. For example, pellets comprising ionomers (A) may be fed into an extruder in which the temperature in the extruder is at least 10° C. greater than the melting peak temperature of ionomer (A). The melted polymer composition is extruded through a die and subsequently cooled to form the filament, strand, or fiber of the desired diameter. Filaments of any diameter may be prepared but useful diameters typically range from 1.5 to 3.1 mm. Preferably, filament diameters range from about 1.75 mm to 2.85 mm.

Process for Producing 3D-Printed Articles

A process for making 3D-printed articles from conditioned or unconditioned filaments comprises the step of feeding the filament through a heated nozzle and depositing a plurality of layers of material using a 3D printer to form a 3D-printed article wherein said filament comprises an ionomer (A) prepared from a base resin (B);
wherein:
base resin (B) is prepared from ethylene and at least one $C_3$ to $C_8$ α, β ethylenically unsaturated carboxylic acid monomer;
the carboxylic acid moieties of base resin (B) are 10 to 99.5 percent neutralized by zinc or lithium;
the at least one $C_3$ to $C_8$ α, β ethylenically unsaturated carboxylic acid is present from about 2 weight percent to about 30 weight percent, based on the weight of base resin (B).

Ionomer (A) may be used to prepare filaments, fibers, and strands for use in producing articles by fused filament fabrication processes. Filaments comprising ionomers (A) as described herein, allow articles to be prepared using 3D printing techniques and in particular FFF. Such articles exhibit desirable properties such as vertical relative strength and nominal strain at break. Such articles exhibit desirable properties such as moisture tolerance, strength, and improved surface appearance.

When filaments disclosed herein are used in fused filament fabrication processes to produce 3D printed articles it is preferred that the nozzle of the 3D printer is heated to a temperature such that the filament is melted to have a melt flow of at least 0.1 g/10 min. Typically, the temperature of the nozzle, also referred to as the hot-end of the 3D printer, is heated to a temperature at least 50° C. to 200° C. greater than the melting peak temperature of the filament. The molten filament exits the die and is deposited in a layer-by-layer fashion to form the desired article. Control of deposition rate may be varied by altering the filament feed rate, filament cross sectional dimensions, and the rate of motion of the die head and/or article. If the filament is unconditioned, the temperature of the nozzle may be at least 50° C. to 120° C. greater than the melting peak temperature of the filament. If the filament is conditioned, the temperature of the nozzle may be at least 80° C. to 200° C. greater than the melting peak temperature of the filament.

3D-Printed Articles 3D printed articles prepared from filaments disclosed herein, when in the shape of ISO 527-2 test bars, exhibit a vertical relative strength of greater than 2, preferably greater than about 2.5, more preferably greater than about 2.9.

3D printed articles, when printed from unconditioned filaments disclosed herein, and in the shape of a hollow single-wall cylinder and tested according to the Temperature Range Test, exhibit a temperature range greater than 20 degrees, and preferably greater than about 50 degrees.

3D printed articles, when printed from unconditioned filaments disclosed herein, and in the shape of a hollow single-wall cylinder and tested according to the Temperature Range Test, exhibit no macroscopic bubbles at one or more temperatures greater than 170° C.

3D printed articles, when printed from conditioned filaments disclosed herein, and in the shape of a hollow single-wall cylinder and tested according to the Temperature Range Test, exhibit a temperature range greater than 60, preferably greater than about 70, more preferably greater than about 80, and most preferably greater than about 90 degrees centigrade.

3D printed articles when printed from conditioned filaments disclosed herein, and when in the shape of ISO 527-2 test bars, exhibit a vertical relative strength of greater than 2 and a temperature range greater than 60 when tested according to the Temperature Range Test.

3D printed articles when tested according to the Temperature Range Test, exhibit no visible surface bubbles between print temperatures of 170° C. to 240° C., and preferably between 170° C. to 270° C.

3D printed articles when printed from conditioned filaments disclosed herein, and when in the shape of ISO 527-2 test bars, exhibit a vertical relative strength which is at least 50 percent greater than the vertical relative strength of an identical 3D printed article but wherein the ionomer is neutralized with sodium ions or magnesium ions.

3D printed articles when printed from conditioned filaments disclosed herein, and when in the shape of ISO 527-2 test bars, exhibit a nominal strain at break of greater than 20 percent.

Preferably, the 3D printed articles are prepared from conditioned or unconditioned filaments having diameters ranging from 1.5 to 3.1 mm. Printing of the conditioned and particularly the unconditioned filaments comprising ionomers (A) disclosed herein is particularly favorable when the height to width ratio of the lines deposited by fused filament fabrication is at least about 0.7, providing parts with improved aesthetic appearance, such as reduced dark spots as compared to parts printed with a height to width ratio of lines than about 0.7.

These filaments address the industry needs described herein of moisture-tolerant filaments comprising ECP ionomers that exhibit greater moisture tolerance, can be printed over a broader nozzle/hot-end temperature, and exhibit higher z-directional relative strength as compared to current commercial offerings.

The direction that a 3D article is printed and tested has an effect on the property values obtained when testing the articles. When x- and y-directional properties are measured parallel to the direction of layer by layer deposition and z-directional properties are measured perpendicular to the direction of layer by layer deposition, the properties of 3D-printed parts, including parts printed by FFF, exhibit anisotropic mechanical properties, with the term "anisotropic" meaning that the mechanical properties of the 3D-printed part are directionally dependent with the parts having different properties in the x and y directions as compared to the z direction. For example, FFF parts are much more likely to delaminate and fracture when tension is placed in the z direction as compared to the x and y directions. This difference is typically quantitated by comparing the tensile properties of tensile bars printed in the y direction (flat), z direction (vertical) and x-direction (on-edge). For ECPs, the reduction of elongation at break is typically more dramatic than the reduction of strain at break when the properties of tensile bars printed flat and on-edge are compare to those printed in the z-direction. For example, the stress at break of 20% for tensile bars of T-Lyne printed vertically is 73% of the average of the stress at break for tensile bars of T-Lyne printed flat and on-edge. In contrast, the nominal strain at break of 7% for tensile bars of T-Lyne printed vertically is just 4.2% of the average of the nominal strain at break for tensile bars of T-Lyne printed flat and on-edge. Commercial ionomers of ECPs typically exhibit strain at break in the range of 15-40 MPa and nominal elongation at break in the range of 250-700%. Thus, significant improvements in vertical elongation at break are particularly needed for 3D-printed parts of ionomers to exhibit isotropic properties, with "isotropic" meaning that the mechanical properties of the 3D-printed part are directionally independent.

FIG. 1 shows visually shows the various directions in which the test bars can be tested.

EXAMPLES

The exemplary compounds identified by "E" in the tables below are intended only to further illuminate and not to limit the scope of compounds, processes, and articles described and recited herein. Comparative examples are identified in the tables below by "C".

Materials

The following ionomers were used to prepare filaments for printing 3D articles.

C1: An ethylene/methacrylic acid copolymer comprising ethylene and 19 wt % of methacrylic acid in which 45% of the carboxylic acid moieties are neutralized with sodium ions and available commercially from Taulman3D as T-Lyne.

C2: An ethylene/methacrylic acid copolymer comprising ethylene and 11 wt % of methacrylic acid in which 37% of the carboxylic acid moieties are neutralized with sodium ions.

C3: An ethylene/methacrylic acid copolymer comprising ethylene and 19 wt % of methacrylic acid in which 33% of the carboxylic acid moieties are neutralized with magnesium ions.

E1: An ethylene/methacrylic acid copolymer comprising ethylene and 11 wt % of methacrylic acid in which 57% of the carboxylic acid moieties are neutralized with zinc ions.

E2: An ethylene/methacrylic acid copolymer comprising ethylene and 15 wt % of methacrylic acid in which 22% of the carboxylic acid moieties are neutralized with zinc ions.

E3: An ethylene/methacrylic acid copolymer comprising ethylene and 15 wt % of methacrylic acid in which 42% of the carboxylic acid moieties are neutralized with lithium ions.

E4: An ethylene/methacrylic acid copolymer comprising ethylene and 15 wt % of methacrylic acid in which 53% of the carboxylic acid moieties are neutralized with zinc ions.

E5: An ethylene/methacrylic acid copolymer comprising ethylene and 19 wt % of methacrylic acid in which 39% of the carboxylic acid moieties are neutralized with zinc ions.

E6: An ethylene/methacrylic acid copolymer comprising ethylene and 19 wt % of methacrylic acid in which 36% of the carboxylic acid moieties are neutralized with zinc ions.

Properties

Ionomers C1 to C3 and E1 to E6 all have melt indices in the range of 1-20 g/10 minutes. The melt indices of base resins (B) used to prepare ionomers (A) have melt indices greater than or equal to 20 g/10 minutes to about 250 g/10 minutes. The melt indices of the base resins of C2, C3, E1-E4 and E6 are less than 250. The MI of the base resins of C1 is greater than or equal to 250 and the MI of the base resin of E5 is 250 g/10 minutes. Peak melting temperatures of Ionomers C1 to C3 and E1 to E6 all fall in the range of 80-100° C.

Test Methods

Peak melting temperature was measured according to ASTM E794-06.

Melt Index or Melt Flow Rate (MFR) was measured according to ASTM D1238-13 using a 2.16 kg. weight.

Tensile Stress at Break and Tensile Strain at Break were measured according to ISO 527-2:2012 using Type 5A or Type 1A bars, as specified in the Examples. "Flat" Type 5A and Type 1A bars were printed directly on the printer bed. "Vertical" Type 5A and Type 1A bars and "On-Edge" Type 5A bars were pressed using the appropriate die from a rectangle. In the case of Type 5A bars, the size of the rectangle was 80 mm length×2 mm width×85 mm height. It was printed in the vertical direction with two supporting side walls (20 mm length×2 mm width×85 mm height). In the case of Type 1A bars, the size of the rectangle was 65 mm length×4 mm width×162 mm height. It was printed in the vertical direction with two supporting side walls (38 mm length×2 mm width×165 mm height). In each case, the rectangle and supporting side walls were further supported by the addition of a 20-line brim. "On-Edge" Type 1A bars were printed with support material utilizing the same ionomer material as used in the tensile bar itself. The support material was easily removed with scissors. Alternatively, four "Vertical" Type 5A bars were printing using a .stl file for Type 5A bars connected by thin strands to a central pillar for support and also printed with a 20-line brim. The bars were easily separated from the central pillar with scissors. All bars were printed with 1 shell and 45/−45 degree 100% infill.

Relative strength was calculated according to Equation 1, wherein the tensile strength at break and percent elongation at break are each measured pursuant to ISO 527-2:2012.

Curl Bar Test: This test was adapted from US20140141166 A1 and is used to measure the amount of curl in a 3D printed test sample. Printing of the test samples is performed in a layer-by-layer manner using an extrusion-based additive manufacturing system 3ntr A4v3, commercially available from 3ntr (Oleggio, Italy) and from Plural AM (Portland, Oreg.), where a filament comprising ionomer (A) and having an average nominal diameter of 2.85 mm is used. The test involves treating the entire bed of the 3D printer with a sheet of polyether imide (PEI), commercially available from Aleph Objects, Inc. (Loveland, Colo.; Lulzbot® TAZ PEI sheet; part number 817752016438), and then printing a test bar from tool path instructions to ideally have a 270 mm length, a 10 mm width, and a 10 mm vertical height using the following printer settings: 0.4 mm nozzle, 0.25 mm layer height, 100% 45/−45 degree infill, 1 shell, 2.85 mm filament diameter, and 100% flow. The nozzle and bed temperatures, printing speed, and cooling can be adjusted according to the material being printed. Herein for ionomers (A), a nozzle temperature of 210° C., a bed temperature of 60° C. and a printing speed of 30 mm/sec were used, unless specified otherwise, and the cooling fan was turned on at 100% after printing the first layer. A light layer of glue stick (Elmer's Washable Glue Stick) was applied prior to printing. After the test bar was printed, it was removed from the system and measured for curl at room temperature (25° C.). The curl of the material manifests itself by the ends of the test bar curling up, such that the test bar will bow or curl. The curl measurement involves identifying a line that connects the ends of test bar in the longest dimension and locating the midpoint along the length of the test bar between the ends. The amount of curl is then measured as the height of the displacement of the ends of the test bar measured from the line between the two ends of the test bar to the surface of the test bar at the midpoint. This height of the displacement may be measured with a micrometer and recorded in mm. In other words, a line is drawn between the edge of the two ends in the lengthwise direction (longest direction) of the test bar. The distance or height between the midpoint of the test bar in the lengthwise direction and the line created by the two ends of the test bar is the degree of curl in mm.

Temperature Range Test: This test involves printing a single-wall cylinder with 0% infill and 0.25 mm layer height at various nozzle temperatures. A range of nozzle temperatures can be explored by varying the temperature with height. Software is available from Cura or Simplify3D which may be used to run these tests. The single-wall cylinder has a total vertical height of 120 mm and a diameter of 40 mm. The temperature range used in this test typically ranged from 170 C to 270 C, although temperatures as low as 140° C. were tested for filaments that successfully printed at 170° C. or exhibited macroscopic bubbles at temperatures of 170° C. and above. Once the cylinder has been printed, the cylinder is inspected using the unaided human eye. The temperature region in which macroscopic bubbles are present due to release of moisture is identified by visual examination using the unaided human eye and correlated with the height/printing temperature of the cylinder in that region. The temperature range in which the filament being tested can print a 3D cylinder test sample without visible bubbles is recorded as the printing temperature range.

Samples which are "conditioned" have been placed in a vacuum oven for greater than 24 hours at 60° C. Samples which are "unconditioned" have been exposed for 1 week or more at a temperature of about 25° C. and a relative humidity of about 50%.

Process for Making Filaments: Filaments comprising ionomer (A) were produced by feeding ionomer pellets to a 28 mm twin screw extruder equipped with a Zenith PEP-II melt pump. The barrel temperatures and melt pump temperature were set between 170-240° C. depending on the individual ionomers used. As the hot melt came out of the die, it was quenched into a water bath with quenching temperatures between 5-60° C. The quenched filament was moved by a strand puller with controlled rate and wound onto spools. Two diameters of filaments, nominally 2.85 mm and 1.75 mm, were produced by adjusting the pulling rate.

Fused Filament Fabrication Process

The following printers were used, as specified, for the examples described herein: (a) Lulzbot® Mini (Aleph Objects, Inc. (Loveland, Colo.) equipped with a standard direct-drive extruder and 0.5 mm nozzle and utilizing nominally 2.85 mm filament. (b) Lulzbot® Mini (Aleph Objects, Inc. (Loveland, Colo.) equipped with a flexystruder direct-drive extruder and 0.6 mm nozzle and utilizing nominally 2.85 mm filament. (c) 3ntr A4v3 (3ntr, Oleggio, Italy; also available from Plural AM of Portland, Oreg.) equipped with two indirect drive and one direct drive extruder, all with 0.4 mm nozzles and utilizing nominally 2.85 mm filament. (d)

Makergear M2 (Makergear, LLC; Beachwood, Ohio) equipped with a direct-drive extruder and 0.35 mm nozzle and utilizing nominally 1.75 mm filament.

All attempts were made to prepare 3D test samples under identical conditions for the examples and comparative examples in tables 1, 2 and 3 with the nozzle temperature optimized for maximizing vertical relative strength of ionomers C3 and E4 in Table 3. Table 1 shows the results of various test samples which were printed using filaments comprising different ionomers and tested utilizing the Temperature Range Test. These results clearly show the advantage of using ionomers comprising Zn or Li ions compared to using ionomers comprising Na or Mg ions. Examples E1 to E3 and E5 exhibit improved temperature ranges when unconditioned filaments are used compared to test samples comprising ionomers which have been neutralized with Na or Mg ions (C1 to C3). Particularly, zinc or lithium neutralized ionomers having a relative percent neutralization below about 7.0 exhibit a broad temperature range for both conditioned and unconditioned filaments.

TABLE 1

| | Relative % Neutralization | Temperature Range Conditioned Filament | Temperature Range Unconditioned Filament |
|---|---|---|---|
| C1 | 8.6 | 60 (170-230° C.) | 0 (Bubbles above 170° C.) |
| C2 | 4.1 | NM | 10 (150-160° C.) |
| C3 | 6.3 | 40 (180-220° C.) | 10 (190-200° C.) |
| E1 | 6.3 | 100 (170-270° C.) | 100 (140-240° C.) |
| E2 | 3.3 | 100 (170-270° C.) | 60 140-200° C. |
| E3 | 6.3 | 100 170-270° C. | 70 170-240° C. |
| E4 | 8.0 | NM | NM |
| E5 | 7.4 | 90 (180-270° C.) | 20 (190-210° C.) |
| E6 | 6.8 | NM | NM |

Cylinders were printed over a range with a Lulzbot ® Mini equipped with a flexystruder direct-drive extruder and 0.6 mm nozzle using nominally 2.85 mm filament.
NM—Not measured Tensile properties are reported for flat, edge, and vertical type 5A test bars, with the edge and vertical bars pressed from printed rectangles as disclosed herein, unless indicated otherwise. A Lulzbot® Mini 3D printer equipped with a flexystruder and 0.6 mm nozzle was used to print the test bars and rectangles of table 2 using a 0.25 mm layer height at 10-15 mm/sec printing speed. The nozzle temperature was 240° C. and the bed temperature was 60° C. Tensile stress at break, vertical nominal strain at break, and vertical relative strength were measured for each sample and shown in table 2.

The results in table 2 show that vertical nominal strain at break for examples E1, E2, and E5 is at least 200% greater than for comparative example C1 which has a vertical nominal strain at break of 7 percent.

Table 2 also shows that stress at break values are not drastically affected by the ionomer used to prepare 3D printed articles. Table 2 also shows that when 3D printed articles are printed as flat or edge articles, the difference in physical properties is not considerably different between samples and comparative examples. When test bars are printed vertically, there is an obvious improvement in nominal strain at break and vertical relative strength of the examples relative to the comparative example.

TABLE 2

| | Tensile Stress at Break (MPa) | | | Vernical Nominal Strain at Break (%) | | | Vertical Relative Strength |
|---|---|---|---|---|---|---|---|
| | Flat | Edge | Vertical | Flat | Edge | Vertical | |
| C1 | 28 | 27 | 20 | 178 | 157 | 7 | 1.4 |
| E1 | 22 | 23 | 12 | 243 | 248 | 29 | 3.5 |
| E2 | 19 | 24 | 11 | 275 | 306 | 77 | 8.5 |
| E5[a] | — | — | 14 | — | — | 21 | 2.9 |

[a]Printed as vertical Type 5A bars connected by thin strands to a central pillar for support The 3D printed rectangular bars from which the test bars for table 3 were pressed, were printed using a 3ntr A4v3 3D printer equipped with a 0.4 mm nozzle, using a 0.25 mm layer height, 30 mm/sec printing speed, and a bed temperature of 60° C. Vertical tensile bars were obtained at nozzle temperatures of 210° C., 225° C. and 240° C. for C3, at 195° C. for E2, and at 195° C., 210° C. and 225° C. for E4.

Table 3 shows that 3D printed test samples prepared from filaments comprising Zn-based ionomers (A), exhibit vertical relative strengths (E2 and E4) that are greater than vertical relative strengths exhibited by magnesium ionomer C3.

The optimum temperature for printing ionomers of different compositions will not all be the same. Therefore, for C3 and E4 of Table 3, tensile properties were measured at several temperatures in order to compare optimal properties for the different ionomers. Vertical tensile bars were printed at nozzle temperatures of 210° C., 225° C. and 240° C. for C3, at 195° C. for E2, and at 195° C., 210° C. and 225° C. for E4 with the maximum or best values obtained for both nominal strain at break and relative strength reported in the table along with the temperature at which this maximum value was obtained. Note that even though no attempt was made to optimize the printing temperature of E2, and even though this filament was printed at a very low nozzle temperature of 195° C., a high vertical relative strength of 12.6 MPa was obtained.

TABLE 3

| | Nozzle Temp. (° C.) | Vertical Tensile Stress at Break (MPa) | Vertical Nominal Strain at Break (%) | Vertical Relative Strength |
|---|---|---|---|---|
| C3 | 210 | 16.5 | 12.3 | 2.0 |
| E2 | 195 | 12.9 | 97.8 | 12.6 |
| E4 | 225 | 11.4 | 73.7 | 8.4 |

Tensile Stress at Break (MPa) and Nominal Strain at Break (%) were measured for vertical Type 5A bars pressed from rectangles for C3, E2 and E4.

Table 4 provides additional examples illustrating the high vertical relative strength of the zinc and lithium ionomers disclosed herein when printed over a range of temperatures.

Examples in table 4 were prepared using a Makergear M2 equipped with a 0.35 mm nozzle, using a 0.25 mm layer height, a bed temperature of 60° C., and 15 mm/sec printing speed. Rectangle bars were printed under these conditions and vertical Type 5A bars pressed from these rectangles for E3. For E1, E2, E5 and E6 vertical Type 5A bars connected by thin strands to a central pillar for support were directly printed and not pressed from rectangular bars. Tensile Stress at Break (MPa) and Nominal Strain at Break (%) were measured on each test bar.

TABLE 4

|    | Nozzle Temp. (° C.) | Vertical Tensile Stress at Break (MPa) | Vertical Nominal Strain at Break (%) | Vertical Relative Strength |
|----|------|------|------|------|
| E1 | 225 | 17.4 | 23.3 | 4.1 |
| E1 | 240 | 14.4 | 27.5 | 4.0 |
| E1 | 255 | 14.6 | 47.9 | 7.0 |
| E2 | 195 | 11.3 | 63.4 | 7.2 |
| E2 | 210 | 13.2 | 64.7 | 8.5 |
| E2 | 225 | 15.0 | 66.2 | 9.9 |
| E2[a] | 225 | 14..9 | 88.3 | 13.2 |
| E2 | 240 | 15.9 | 47.7 | 7.6 |
| E3[a] | 225 | 14.6 | 21.8 | 3.2 |
| E5 | 195 | 21 | 14 | 2.9 |
| E6 | 210 | 23.6 | 21.0 | 5.0 |

[a]printing speed was 30 mm/sec

Example E7

A 270 mm×10 mm×10 mm test bar (L×W×H) printed from a filament comprising the ionomer of E2 was printed and tested using the curl test. E2 had a curl (height of displacement at midpoint) of 0.025 mm.

The invention claimed is:

1. A 3D printed article prepared from a conditioned or unconditioned filament, said filament comprising an ionomer (A), said ionomer (A) prepared from a base resin (B); wherein:
   base resin (B) is prepared from ethylene and at least one $C_3$ to $C_8$ α, β ethylenically unsaturated carboxylic acid monomer;
   the carboxylic acid moieties of base resin (B) are 10 to 99.5 percent neutralized by zinc or lithium;
   the at least one $C_3$ to $C_8$ α, β ethylenically unsaturated carboxylic acid is present from about 2 weight percent to about 30 weight percent, based on the weight of base resin (B).

2. The 3D printed article of claim 1 wherein base resin (B) has a melt index of 20 to 250 g/10 minutes or less when measured according to ASTM D1238-13 using a 2.16 kg. weight.

3. The 3D printed article of claim 1 wherein ionomer (A) has a relative percent neutralization of 8 or less.

4. The 3D printed article of claim 1 wherein ionomer (A) has a relative percent neutralization of 7 or less.

5. The 3D printed article of claims 1 and 2 wherein the $C_3$ to $C_8$ α, β ethylenically unsaturated carboxylic acid is present from 2 weight percent to 18 weight percent.

6. The 3D printed article of claim 1 wherein ionomer (A) has a melt index of at least about 1 to 20 g/10 minutes using a 2.16 kg weight measured according to ASTM D1238-13.

7. The 3D printed article of claim 1 which, when in the shape of ISO 527-2 test bars, exhibits a vertical relative strength of greater than 2.

8. The 3D printed article of claim 1 which, when in the shape of ISO 527-2 test bars, exhibits a vertical relative strength of greater than 3.

9. The 3D printed article of claim 1 which, when in the shape of ISO 527-2 test bars, exhibits a vertical relative strength which is at least 50 percent greater than the vertical relative strength of an identical 3D printed article but wherein the ionomer is neutralized with sodium ions or magnesium ions.

10. The 3D printed article of claim 1 which, when in the shape of ISO 527-2 test bars, exhibits a nominal strain at break of greater than 20 percent.

11. The 3D printed article of claim 1 which, when in the shape of a hollow single-wall cylinder and tested according to the Temperature Range Test, exhibits a temperature range greater than 60.

12. The 3D printed article of claim 1 wherein the filament is unconditioned.

13. The 3D printed article of claim 1 which, when in the shape of a hollow single-wall cylinder and tested according to the Temperature Range Test, exhibits a temperature range greater than 20.

14. The 3D printed article of claim 2 which, when in the shape of a hollow single-wall cylinder and tested according to the Temperature Range Test, exhibits no macroscopic bubbles at one or more temperatures greater than 170° C.

15. The 3D printed article of claim 1 in which the filament diameter ranges from 1.5 to 3.1 mm.

16. The 3D printed article of claim 1 prepared by the deposition of one or more lines by fused filament deposition.

17. A process for making a 3D printed article from a conditioned or unconditioned filament, said process comprising the step of depositing a plurality of layers using a 3D printer to form said 3D printed article wherein said filament comprises an ionomer (A) prepared from a base resin (B); wherein:
   base resin (B) is prepared from ethylene and at least one $C_3$ to $C_8$ α, β ethylenically unsaturated carboxylic acid monomer;
   the carboxylic acid moieties of base resin (B) are 10 to 99.5 percent neutralized by zinc or lithium;
   the at least one $C_3$ to $C_8$ α, β ethylenically unsaturated carboxylic acid is present from about 2 weight percent to about 30 weight percent, based on the weight of base resin (B).

18. The process of claim 17 wherein base resin (B) has a melt index of 20 to 250 g/10 minutes or less when measured according to ASTM D1238-13 using a 2.16 kg. weight.

19. The process of claim 17 wherein ionomer (A) has a relative percent neutralization of about 8 or less.

* * * * *